United States Patent [19]
Lee

[11] Patent Number: 5,239,439
[45] Date of Patent: Aug. 24, 1993

[54] PROTECTION CIRCUIT FOR POWER SUPPLY SYSTEMS

[75] Inventor: Kyoung-Geun Lee, Seoul, Rep. of Korea

[73] Assignee: SamSung Electronics Co., Ltd., Kyungki-do, Rep. of Korea

[21] Appl. No.: 677,331

[22] Filed: Mar. 29, 1991

[30] Foreign Application Priority Data

Apr. 14, 1990 [KR] Rep. of Korea ............... 1990-4569

[51] Int. Cl.$^5$ .................................................. H02H 3/24
[52] U.S. Cl. ........................................ 361/90; 361/78
[58] Field of Search ................. 361/90, 78, 91, 92, 361/93, 86, 87, 24, 30, 18

[56] References Cited

U.S. PATENT DOCUMENTS

| | | | |
|---|---|---|---|
| 3,573,554 | 4/1971 | Theobald | 361/90 |
| 4,479,125 | 10/1984 | Mori | 340/825 |
| 4,503,479 | 3/1985 | Otsuka et al. | 361/90 |
| 4,951,171 | 8/1990 | Tran et al. | 361/90 |
| 4,999,730 | 3/1991 | Pickard | 361/90 |

Primary Examiner—A. D. Pellinen
Assistant Examiner—S. Jackson
Attorney, Agent, or Firm—Robert E. Bushnell

[57] ABSTRACT

A power protection circuit for detecting the level of output voltage source from a power supply, comprises a first detector for detecting a first output state of the power supply, a second detector for detecting a second output state of the power supply, an abnormality detector for recognizing the detecting states of the first and second detection means and detecting an abnormality state from the outputs of the power supply and generating an abnormality signal responsive to said abnormality state, an initial-ineffective circuit for making said abnormality signal ineffective when source voltage is supplied at the first stage, a driver for receiving said abnormality signal from said abnormality detecting means and generating continuous abnormality signal once said abnormality state is occurred.

20 Claims, 2 Drawing Sheets

PROTECTION CIRCUIT FOR POWER SUPPLY SYSTEMS

BACKGROUND OF THE INVENTION

The present invention relates to a protection circuit in power supply systems, and more particularly to a circuit for providing protection from an unexpected excessive state of the output voltage.

Generally, a power circuit can be damaged when there is an excessive flow of current at the output terminal. Such possible damage has been solved by the use of a power protection circuit, which keeps the power circuit from being influenced when its load circuit is short, the output current of the power supply goes up higher than a given level because of malfunction in somewhere, or the circuit makes a wrong operation for the cause of itself.

Until now, there have been developed many kinds of the power protection circuits. Most of them have the function of detecting an excessive current on the loads and shutting off the current passage from the output of the power supply. And most of them employ two discrete circuit configurations for separately detecting a lower or a higher level than a given level of the output voltage.

However, since the conventional protection circuit employes the two discrete circuit configurations, there is a setback that the circuit becomes rather complicated so as to be reduced in its reliability.

SUMMARY OF THE INVENTION

Accordingly, it is an object of the invention to provide a circuit wherein a single circuit configuration is capable of handling detection of not only the higher state but also the lower state of the output voltage of the power supply than a given level.

It is another object of the invention to provide a circuit having improved reliability as a power protection circuit.

In order to accomplish the stated objects of the invention, a power protection circuit is connected to a power supply 100. It comprises a first detection device 10, a second detection device 20, an abnormality detecting device 30, an initial-ineffective device 40, and a driving device 50.

The first detection device 10 is connected to the first output terminal 01 of the power supply 100 and detects its abnormality state. The second detection device 20 is connected to the second third and fourth output terminals 02, 03, 04, of the power supply 100 and after receiving the output of the first detection device 10 and the second detection means 20, the abnormality device 30 describes abnormality state in the power supply 100 by detecting, generating and outputting abnormality when abnormality signal is generated from the output of the power supply 100. The abnormality detecting device 30 is connected to both the output terminal of the first and the second detection device and recognizes their abnormality state to generate an abnormality signal. The initial-ineffective device 40 removes a abnormality signal when the abnormality signal which describes abnormality state of the abnormality detection device 30 is generated from the abnormality detection device 30 at an initial stage. The driving device 50 receives an abnormality signal from the abnormality detecting means and outputs a continuous abnormality signal though the abnormal state is occurred at a time.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
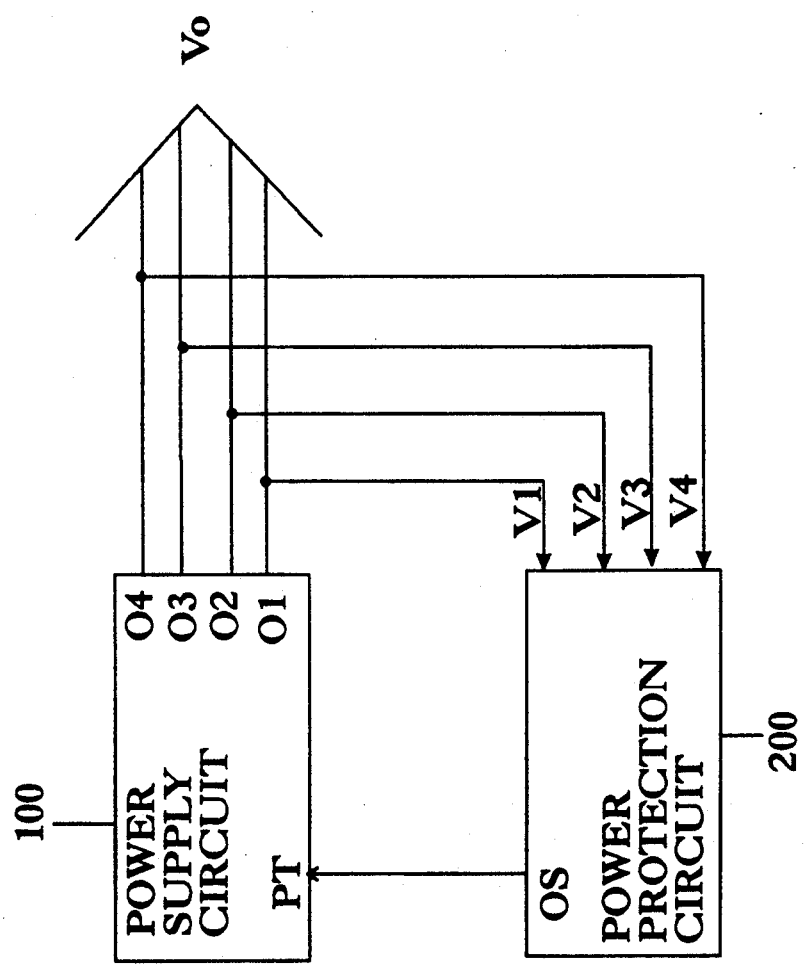
FIG. 1 is a schematic block diagram according to the invention.
Figure 2:
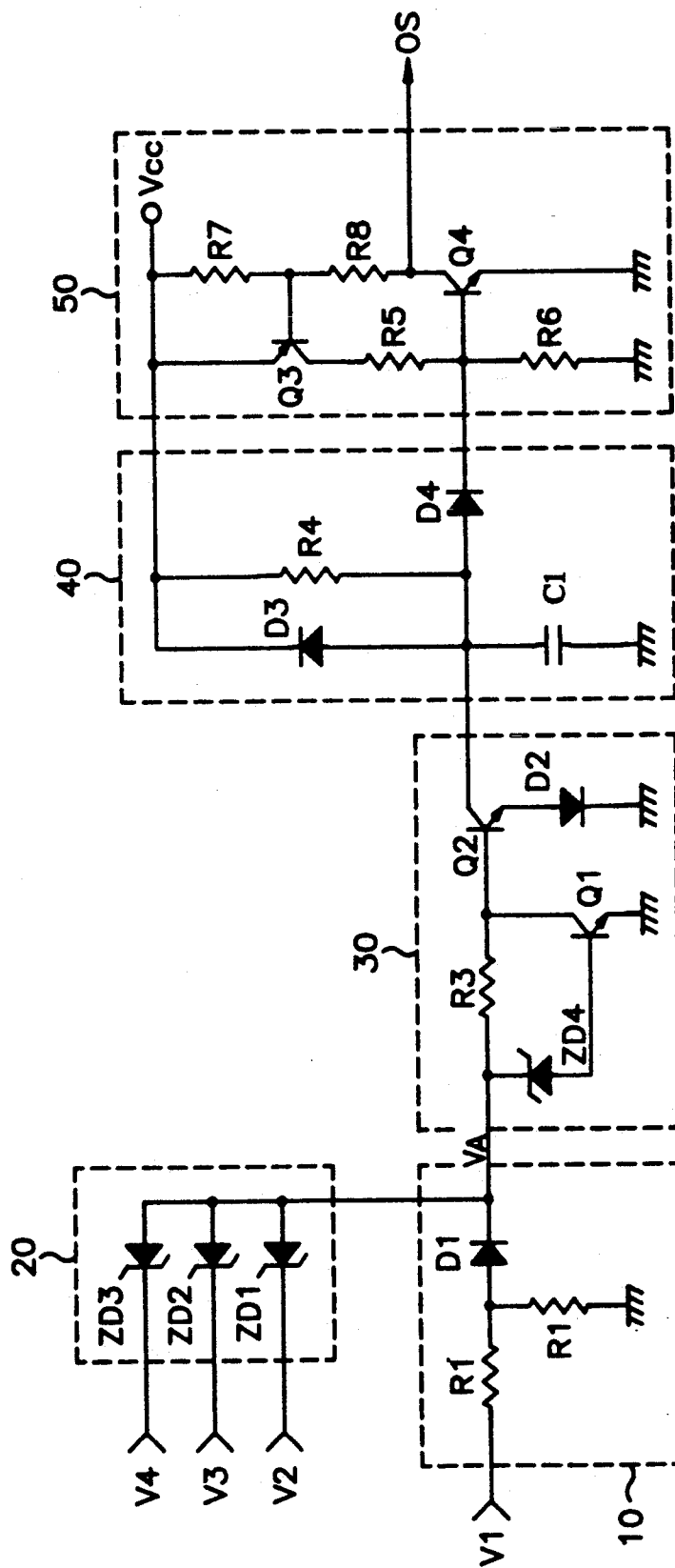
FIG. 2 is a circuit diagram according to the invention.

Referring to FIG. 1, the power protection circuit 200 of the invention is coupled to a power supply 100. The circuit 200, as drawn in FIG. 2, has a first detection device 10, a second detection device 20, an abnormality detection device 30, an initial-ineffective device 40, and a driving device 50.

The first detection device 10 comprises resistors R1, R2, which are serially connected between the first output terminal 01 of the power supply 100 and the ground, and a diode D1 whose anode is connected to the connection node between the two resistors R1, R2.

The second detection device 20 comprises zenor diodes ZD1, ZD2 and ZD3 having cathodes each connected to the second, third and fourth output terminals 02, 03, 04 of the power supply 100. Anodes of the zenor diodes are commonly connected to a cathode of the diode D1.

The abnormality detecting device 30 comprises a resistor R3, a zenor diode ZD4, a diode D2, and two transistors Q1 and Q2. A cathode of the zenor diode ZD4 is connected to the resistor R3 and an anode thereof is connected to a base of the transistor Q1. An emitter of the transistor Q1 is connected to the ground, and a collector of the transistor Q1 is connected to resistor R3. An emitter of the transistor Q2 is connected to the anode of the diode D2, and the collector of the transistor Q1 is connected to the base of the transistor Q2. The diode D2 is connected between the emitter of the transistor Q2 and the ground.

The initial-ineffective device 40 comprises a capacitor C1 connected between the collector of the transistor Q2 and the ground, a diode D3 and a resistor R4 that are parallel-connected between the collector of the transistor Q2 and the driving voltage source terminal Vcc, and a diode D4 whose anode is connected to the collector of the transistor Q2.

The driving device 50 comprises four resistors R5, R6, R7, R8 and two transistors Q3, Q4. The resistor R5 is connected to the cathode of the diode D4 and the collector of the transistor Q3. The resistor R6 is connected between the cathode of the diode D4 and the ground. the collector of the transistor Q3 is connected to the resistor R5 and the emitter of thereof is connected to the driving voltage source terminal Vcc. The resistor R8 is coupled to the base of the transistor Q3. The emitter of the transistor Q4 is connected to the ground, the base thereof is connected to resistor R6, and the collector thereof is connected to the resistor R8. The resister R7 is connected to between the emitter and the base of the transistor Q3.

Next, the operation in each block of the power supply in its normal state is described in detail. Provided that the output voltage level of the first, second, third and fourth output terminals 01, 02, 03 and 04 of the power supply 100 are V1, V2, V3 and V4, respectively, each value of the terminal is maintained at given levels.

The first detection device 10 detects the state of the output voltage level V1 at the first output terminal 01 of the power supply. The resistors R1 and R2 of the first detection device 10 are serially connected together and divide the output voltage level V1. the diode D1 makes the output current of the first output terminal be passed by turning on at the normal state. The second detection means 20 detects the each state of the output voltage levels V2, V3 and V4 of the output terminal 02, 03, 04 of power supply 100 The zenor diodes ZD2, ZD3 and ZD4 respectively corresponding to the second, third and fourth output terminals 02, 03, 04 of the power supply are altogether turned off at the normal state.

The abnormality detecting device 30 receives the outputs of the first and second detection device 10, 20, namely the output voltage level of the first, second, third and fourth output terminals. At the normal state, the output voltage level of the second detection device 20 becomes 0V because the zenor diodes ZD2, ZD3 and ZD4 are turned off. Assuming that the output voltage level of the first detection device 10 is VA, the voltage level VA is $V1 \times R2/(R1+R2) - 0.2$ as value divided from the output voltage of the first output terminal. Therefore, if the output of the first detection device 10 is supplied to the abnormality detecting device 30, a voltage substracted from a voltage dropped value at the resister R3 is applied to the base of the transistor Q2 in the abnormality detection 30. As this voltage is higher than the sum of base-emitter voltage at the transistor Q2 and turn-on voltage at the diode D2, the transistor Q2 is turned on and zenor voltage of the zenor diode ZD4 is established to make operation bias voltage of the transistor Q1 be substracted from output voltage level VA of the first detection device 10 so that the transistor Q1 is turned off due to absence of current in the base.

The input terminal of the driving device 50 is coupled to the collector of the transistor Q2 in the abnormality detecting device 30 in order to receive the output of the transistor Q2. The turn-on of transistor Q2 is enabled by driving the voltage source Vcc, which is supplied to the collector of the transistor Q2 through the resistor R4. At this time, voltage level at the input terminal of the driving device 50 is lowered to approximately 0.4 V. Otherwise, if an abnormality state is generated from the power supply, the abnormality detection device is operated to generate the abnormality signal, which is an edge signal response to a logic "high" at the input terminal of the driving device 50 when the transistor Q2 is turned off. Thus, the transistor Q2 is not turned off as long as the output voltage level of the power supply is at the normal state, and the signal of abnormality state is not generated at the input terminal of the driving device 50. If there is no abnormality state at the input terminal of the initial ineffective means 30, the diode D4 is reverse-biased, the transistor Q4 is turned off because of no current at its base and the transistor Q3 also off, so that the driving device 50 cannot be operated. Accordingly, the driving device 50 only generates a normal state signal of logic "high" state at the normal state.

Next, if output level state of the output terminal in the power supply 100 is higher or lower than a given level, operation of each circuit is describes in detail.

If the voltage level of the first output terminal 01 of the power supply 100 becomes lower than the given level because of an abnormality state, the output voltage level of the first detection device 10 is lowered and the input voltage level of the abnormality detecting device 30 is lowered as well, so that the input voltage level of the transistor Q2 is lowered. A drop of the input voltage of the abnormality defection device makes the base voltage level of the transistor Q2 be lowered. If the base voltage level is lower than the sum of the operation bias voltage and turn-on voltage of the diode D2, the abnormality detecting device 30 generates an edge signal, rising to high level, to the input terminal of the driving device 50. That is, when an abnormality signal is generated from the first output terminal of the power supply, it is a function of the abnormality detection device to generate, to output the abnormaliy signal. Also, if any one or all of the output terminals 02, 03, 04 of the power supply is at the voltage level lower than the given level, each zenor diode being applicable to the output terminal having lowered level can be turned on by forward biasing. So, the input level of the abnormality detecting device 30 is lowered, so that the charge on the input terminal is flowed off through the zenor diode turned on to the output terminal having lowered level. Thus the transistor Q2 is turned off and an abnormality signal is generated from the input terminal of the driving device 50. Therefore, as same as the state of higher output voltage level described above, the abnormality detecting device 30 can generate the abnormality state signal.

On the contrary, if the first output terminal 01 of the power supply goes up due to some problem therein, output voltage of the first detection device 10 goes up as well. At this time, when the voltage rises to a level higher than the reverse zenor voltage level of the zenor diode ZD4, reverse-biased zenor current flows through the zenor diode ZD4. Then, the transistor Q1 is turned on by the flow of the base current. The base voltage level of the transistor Q2 goes to the ground so that the transistor Q2 is turned off. By the operation, the abnormality signal is transferred to the input terminal of the driving device 50, and the driving device 50 generates the abnormality state signal.

Also, if any one or all of the output terminals 02, 03, 04 of the power supply rises to an excessively high level due to some problem therein, zenor breakdown occurs in one or all of the zenor diodes of the second detection device 20, thus high voltage is applied to the input terminal of the abnormality detection device 30. Also, at this time, the abnormality detection device 30 generates the abnormality signal and the driving device 50 outputs the abnormal state signal responsive to the abnormality signal.

As described in the foregoing, the present invention has an advantage that provides for detection of the abnormality state at any one of the first, second, third and fourth output terminal of the power supply, for detecting the state of the output voltage level either lower or higher than the given level.

In the preferred embodiment of the invention, the number of the output terminals of the power supply are only four just for the sake of ease of description. But, by increasing the number of zenor diodes in the second detection means 20, a power supplier having any number of output terminals can be protected from possible occurrence of excessively high voltages or currents. In addition, the transistors, of the driving means 50 can be replaced with other device such as SCR, and also other circuit elements of FIG. 1 are possibly changed in the scope of the present invention.

Various modifications are apparent to those skilled in the art without departing from the spirit and scope of the present invention which is only limited by the appended claims. Therefore, the embodiment shown and described is only illustrative, not restrictive.

What is claimed is:

1. A power protection circuit for protecting a power supply from an excessive current or voltage at a plurality of output terminals of the power supply, said power protection circuit comprising:
    first detecting means coupled to one of said plurality of output terminals of the power supply, for detecting a first output state of the power supply to provide a first detected signal;
    second detecting means coupled to remaining output terminals of said plurality of output terminals, for detecting output states of said remaining output terminals of the power supply to provide a second detected signal;
    abnormality detecting means for detecting abnormal states of said first detected signal and said second detected signal to generate an abnormality signal in response to the detected abnormality states; and
    driving means coupled to receive said abnormality signal, for driving said abnormality signal to provide a malfunctional signal to discontinue the power supply at said plurality of output terminals.

2. The power protection circuit of claim 1, wherein said first detecting means divides a voltage of said first output terminal of said power supply and enables transmission of the divided voltage over a given potential barrier.

3. The power protection circuit of claim 1, wherein said second detecting means comprises a plurality of zener diodes respectively connected to said remaining output terminals of said plurality of output terminals, for enabling transmission of the power supply having voltages higher or lower than a reference voltage to provide said second detected signal.

4. The power protection circuit of claim 1, wherein said abnormality detecting means applies said abnormality signal to said driving means if the input voltage is lower than a low reference voltage or higher than a high reference voltage, and an input of said driving means is grounded if an input voltage level is at a given level.

5. The power protection circuit of claim 1, wherein said abnormality detecting means comprises an open collector type of transistors.

6. The power protection circuit of claim 1, wherein said driving means comprises:
    a first transistor having a base coupled to receive said abnormality signal, an emitter connected to ground, and a collector coupled to a driving voltage source via a serially connected first and second resistors;
    an output terminal connected to the collector of said first transistor, for providing said malfunctional signal;
    a third resistor interposed between the base of said first transistor and a reference potential; and
    a second transistor having a base connected between the serially connected first and second resistors, a collector coupled to receive said driving voltage source, and an emitter connected to the base of said first transistor via a fourth resistor.

7. The power protection circuit of claim 1, further comprising initial-ineffective means coupled to receive said abnormality signal, for disabling said driving means in dependence upon reception of said abnormality signal.

8. The power protection circuit of claim 7, wherein said abnormality detecting means comprises:
    a first transistor having a collector coupled to receive said first and second detected signals via a first resistor, a base coupled to receive said first and second detected signals via a zener diode, and an emitter connected to ground; and
    a second transistor having a base coupled to receive said first and second detected signals via said first resistor, an emitter connected to ground via a first diode, and a collector for providing said abnormality signal.

9. The power protection circuit of claim 8, wherein said initial-ineffective means comprises:
    a second diode and a second resistor interposed in parallel between said collector of said second transistor and a driving voltage source;
    a capacitor interposed between said collector of said second transistor and ground; and
    a third diode coupled to receive said collector of said second transistor, for disabling said driving means in dependence upon reception of said abnormality signal.

10. The power protection circuit of claim 9, wherein said driving means comprises:
    a third transistor having a base connected to said third diode, an emitter connected to ground, and a collector coupled to said driving voltage source via third and fourth resistors;
    a fifth resistor interposed between said third diode and ground; and
    a fourth transistor having a base connected between said third and fourth resistors, a collector coupled to receive said driving voltage source, and an emitter connected to said third diode via a sixth resistor.

11. A protection circuit for power supply systems having a plurality of voltage sources at a plurality of voltage terminals, comprising:
    first detecting means coupled to receive a first voltage source of said plurality of voltage sources at a first voltage terminal, for detecting a voltage level of said first voltage source to provide a first detected signal;
    second detecting means having a plurality of zener diodes respectively coupled to receive remaining voltage sources of said plurality of voltage sources at remaining voltage terminals, for detecting abnormal voltage levels at the remaining voltage terminals to provide a second detected signal;
    third detecting means responsive to said first and second detected signals, for detecting abnormal voltage levels of one of said first and second detected signals to provide a disabling signal indicative of the detected abnormal voltage level; and
    driving means for generating a malfunctional signal indicative of an OFF state in response to said disabling signal to discontinue generations of said plurality of voltage sources respectively at said plurality of voltage terminals.

12. The protection circuit of claim 11, further comprised initial-ineffective means coupled to receive said disabling signal, for disabling said driving means in dependence upon reception of said disabling signal.

13. The power protection circuit of claim 12, wherein said third detecting means comprises:

a first transistor having a collector coupled to receive said first and second detected signals via a first resistor, a base coupled to receive said first and second detected signals via a zener diode, and an emitter connected to ground; and a second transistor having a base coupled to receive said first and second detected signals via said first resistor, an emitter connected to ground via a first diode, and a collector for serving as an output terminal.

14. The power protection circuit of claim 13, wherein said initial-ineffective means comprises:

a second diode and a second resistor interposed in parallel between said collector of said second transistor and a driving voltage source;

a capacitor interposed between said collector of said second transistor and ground; and a third diode coupled to receive said collector of said second transistor, for disabling said driving means in dependence upon reception of said disabling signal.

15. The power protection circuit of claim 14, wherein said driving means comprises:

a third transistor having a base connected to said third diode, an emitter connected to ground, and a collector coupled to said driving voltage source via third and fourth resistors;

a fifth resistor interposed between said third diode and ground; and a fourth transistor having a base connected between said third and fourth resistors, a collector coupled to receive said driving voltage source, and an emitter connected to said third diode via a sixth resistor.

16. A protection circuit for a power supply system having a plurality of voltage sources at a plurality of voltage terminals, comprising:

first detecting means coupled to receive a first voltage source of said plurality of voltage sources at a first voltage terminal, for detecting a voltage level of said first voltage source to provide a first detected signal;

second detecting means coupled to receive remaining voltage sources of said plurality of voltage sources at remaining voltage terminals, for detecting abnormal voltage levels at the remaining voltage terminals to provide a second detected signal;

third detecting means responsive to said first and second detected signals, for detecting abnormal voltage levels from said first and second detected signals to provide a disabling signal if the abnormal voltage level is detected, and an enabling signal if the abnormal voltage level is not detected; and driving means for generating a first operating signal indicative of an OFF state to the power supply system to discontinue selected generations of said plurality of voltage sources in response to said disabling signal, and a second operating signal indicative of an ON state to said power supply system in response to said enabling signal to continue generations of said plurality of voltage sources.

17. The power protection circuit of claim 16, wherein said first detecting means comprises a voltage divider and a first diode coupled to receive said first voltage source, for providing said first detected signal, and said second detecting means comprises a plurality of zener diodes, each respectively coupled to receive remaining voltage sources of said plurality of voltage sources at said remaining voltage terminals.

18. The power protection circuit of claim 16, wherein said third detecting means comprises:

a first transistor having a collector coupled to receive said first and second detected signals via a first resistor, a base coupled to receive said first and second detected signals via a zener diode, and an emitter connected to reference potential; and a second transistor having a base coupled to receive said first and second detected signals via said first resistor, an emitter connected to reference potential via a first diode, and a collector for serving as an output terminal.

19. The power protection circuit of claim 18, wherein said driving means comprises:

a second diode and a second resistor interposed in parallel between said collector of said second transistor and a driving voltage source;

a capacitor interposed between said collector of said second transistor and ground;

a third diode coupled to receive said collector of said second transistor, for disabling said driving means in dependence upon reception of said abnormality signal;

a third transistor having a base connected to said third diode, an emitter connected to ground, and a collector coupled to said driving voltage source via third and fourth resistors;

a fifth resistor interposed between said third diode and a reference potential; and a fourth transistor having a base connected between said third and fourth resistors, a collector coupled to receive said driving voltage source, and an emitter connected to said third diode via a sixth resistor.

20. The power protection circuit of claim 16, wherein said driving means comprises:

a first transistor having a base coupled to receive one of said disabling signal and said enabling signal, an emitter connected to a reference potential, and a collector coupled to a driving voltage source via a serially connected first and second resistors;

an output terminal connected to the collector of said first transistor, for providing one of said first operating signal indicative of an OFF state and said second operating signal indicative of an ON state;

a third resistor interposed between the base of said first transistor and a reference potential; and a second transistor having a base connected between the serially connected first and second resistors, a collector coupled to receive said driving voltage source, and an emitter connected to the base of said first transistor via a fourth resistor.

* * * * *

UNITED STATES PATENT AND TRADEMARK OFFICE
CERTIFICATE OF CORRECTION

PATENT NO. : 5,239,439
DATED      : Aug. 24, 1993
INVENTOR(S) : Kyoung-Geun Lee

It is certified that error appears in the above-indentified patent and that said Letters Patent is hereby corrected as shown below:

Column 1     Line 55,     after "detection", change "means" to --device--;

Line 61,     after "detection", change "device" to --devices--;

Column 3,    Line 9,      after "detecting", change "device" to --devices--:

Signed and Sealed this

Fifteenth Day of April, 1997

Attest:

BRUCE LEHMAN

Attesting Officer        Commissioner of Patents and Trademarks